US006402116B1

(12) United States Patent
Northup

(10) Patent No.: US 6,402,116 B1
(45) Date of Patent: Jun. 11, 2002

(54) FLAG HOLDER

(76) Inventor: Stephen R. Northup, 3003 Lenape Dr., Collegeville, PA (US) 19426

( * ) Notice: Subject to any disclaimer, the term of this patent is extended or adjusted under 35 U.S.C. 154(b) by 0 days.

(21) Appl. No.: 09/473,743

(22) Filed: Dec. 28, 1999

(51) Int. Cl.$^7$ ................................................ F16M 13/00
(52) U.S. Cl. ....................... 248/514; 116/173; 294/19.2
(58) Field of Search ................................ 248/534, 514, 248/511; 116/174, 173, 175; 294/19.1, 92; 40/603, 604, 607, 606; D11/181, 182, 165, 173; 52/110

(56) References Cited

U.S. PATENT DOCUMENTS

| | | | | | |
|---|---|---|---|---|---|
| 2,912,196 | A | * | 11/1959 | Johnson | 248/538 |
| 3,726,035 | A | | 4/1973 | Bower et al. | 40/125 G |
| 3,926,139 | A | | 12/1975 | Sabin | 116/26 |
| 4,018,182 | A | * | 4/1977 | Knaack | 116/173 |
| 4,574,726 | A | | 3/1986 | Sullivan | 116/28 R |
| 4,582,017 | A | | 4/1986 | Ostermiller | 116/28 R |
| 4,593,877 | A | | 6/1986 | van der Wyk | 248/512 |
| 4,796,553 | A | | 1/1989 | Cogswell et al. | 116/173 |
| 4,864,962 | A | | 9/1989 | Kuehl et al. | 116/174 |
| 4,918,896 | A | | 4/1990 | Wiese | 52/632 |
| 4,925,334 | A | | 5/1990 | Beard | 404/9 |
| 4,962,720 | A | | 10/1990 | Leffel | 116/173 |
| 5,024,179 | A | | 6/1991 | Leffel | 116/173 |
| 5,087,012 | A | | 2/1992 | Doublet | 248/512 |
| 5,253,608 | A | | 10/1993 | Burke | 116/173 |
| 5,255,627 | A | | 10/1993 | Williams | 116/174 |
| 5,267,524 | A | | 12/1993 | Maxwell | 116/174 |
| 5,291,849 | A | | 3/1994 | Zeitler | 116/174 |
| 5,377,944 | A | | 1/1995 | Getsinger | 248/218.4 |
| 5,379,666 | A | * | 1/1995 | Held | 81/53.1 |
| 5,383,420 | A | | 1/1995 | Dundorf | 116/174 |
| 5,428,913 | A | | 7/1995 | Hillstrom | 40/604 |
| 5,477,437 | A | | 12/1995 | Lach | 362/252 |
| 5,533,464 | A | * | 7/1996 | Todd | 116/174 |
| 5,588,630 | A | | 12/1996 | Chen-Chao | 248/514 |
| 5,590,621 | A | | 1/1997 | Sectish | 116/173 |
| 5,615,635 | A | | 4/1997 | Deviney | 116/173 |
| 5,769,474 | A | * | 6/1998 | Moore | 116/173 X |
| 5,806,903 | A | * | 9/1998 | George | 116/173 X |

* cited by examiner

*Primary Examiner*—Leslie A. Braun
*Assistant Examiner*—Gwendolyn Baxter
(74) *Attorney, Agent, or Firm*—William H. Eilberg

(57) ABSTRACT

A flag holder allows the mounting of a flag to a support pole without puncturing the flag. A dowel is first inserted into a channel formed along an edge of the flag. Next, a generally cylindrical sleeve is inserted over the dowel, and over the flag. A slit extending along the length of the sleeve allows the flag to pass through the slit so as to hang freely. Finally, a support pole having a threaded end is screwed into a threaded opening formed in, or connected to, the sleeve. As the support pole is screwed in, its end comes into abutment with the flag, and holds the flag firmly against the dowel. The flag therefore cannot slide along the dowel again, until the support pole is unscrewed. The flag is thus held by friction and pressure, but not with any nail or other puncturing fastener.

11 Claims, 3 Drawing Sheets

FLAG HOLDER

BACKGROUND OF THE INVENTION

The present invention relates to flag holders, and provides a device for holding a flag without damaging the fabric. The device of the present invention also makes it possible to display the flag in a variety of orientations.

It is common to display a flag or banner from a pole attached to a window sill or wall. Such flags may be a national flag, typically displayed on a national holiday, or they may include banners relating to other subjects. The invention can also be used with purely decorative flags or banners.

Many homeowners attach a bracket to a window sill or wall, the bracket defining a generally cylindrical channel which receives a pole that supports a flag or banner. The pole, when inserted into the bracket, usually extends at an angle of about 45° relative to the horizontal, with the flag hanging down from the end of the pole.

A major problem with the arrangement described above arises from the attachment of the flag or banner to the pole. In the prior art, it has been considered necessary to use fasteners such as nails, or the like, to affix the flag to the end of the pole. The use of nails requires that the fabric of the flag be punctured. Thus, in the prior art, a flag that is suspended from the above-described pole will be damaged, at least to a small degree, by the act of attaching it to the pole. Each time the flag is attached and removed from the pole, its fabric will suffers some more deterioration. Repeated attachment of a flag to a pole, using conventional nails, will eventually damage the fabric significantly.

The present invention provides a flag holder which solves the above problems. The unique structure of the flag holder described below entirely avoids the use of nails in mounting a flag or banner, and thus preserves the integrity of the fabric. The flag holder of the present invention allows the flag to be displayed in different orientations, and tends to prevent the flag from wrapping around its support.

SUMMARY OF THE INVENTION

The flag holder of the present invention comprises three components, namely a dowel, a sleeve, and a support pole. The size of the dowel is chosen such that the dowel will fit within a channel formed along an edge of the flag by folding part of the fabric over itself. The sleeve fits over the flag and the dowel. The sleeve has the general shape of a cylinder, but it has a slit which allows the flag to pass through the slit so that the flag can hang freely from the dowel. The sleeve also is, in general, shorter than the dowel. The sleeve includes a side wall having a threaded opening. The support pole has a threaded end which screws into the threaded opening. When the support pole is screwed into the sleeve, the end of the pole abuts the flag, and holds the flag firmly between the end of the pole and the dowel. Thus, the flag is firmly anchored by the constant pressure of the support pole.

The process of attaching the flag to the pole is as follows. First, the dowel is inserted into the channel located along the edge of the flag. Next, the sleeve is fitted over the dowel and the flag, such that the flag passes through the slit in the sleeve. The sleeve is preferably positioned at or near the center of the dowel. Then the support pole is screwed into the sleeve, until the pole abuts the flag with sufficient pressure to prevent the flag from moving. The pole can then be inserted into a conventional bracket or holder. In this process, the flag is never punctured, and is therefore not damaged when it is attached to the pole.

The present invention therefore has the primary object of providing a flag holder.

The invention has the further object of preventing damage to flags or banners when they are suspended from a holder.

The invention has the further object of providing a flag holder which does not puncture the flag.

The invention has the further object of eliminating the use of nails, or other puncturing fasteners, in mounting a flag to a flag holder.

The invention has the further object of providing a device for holding a flag in alternative orientations.

The invention has the further object of reducing the tendency of a flag to become wrapped around its support.

The invention has the further object of providing a flag holder which is simple to use, and which can be easily stored in a disassembled condition when not in use.

The invention has the further object of providing a method of attaching a flag to a support pole.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
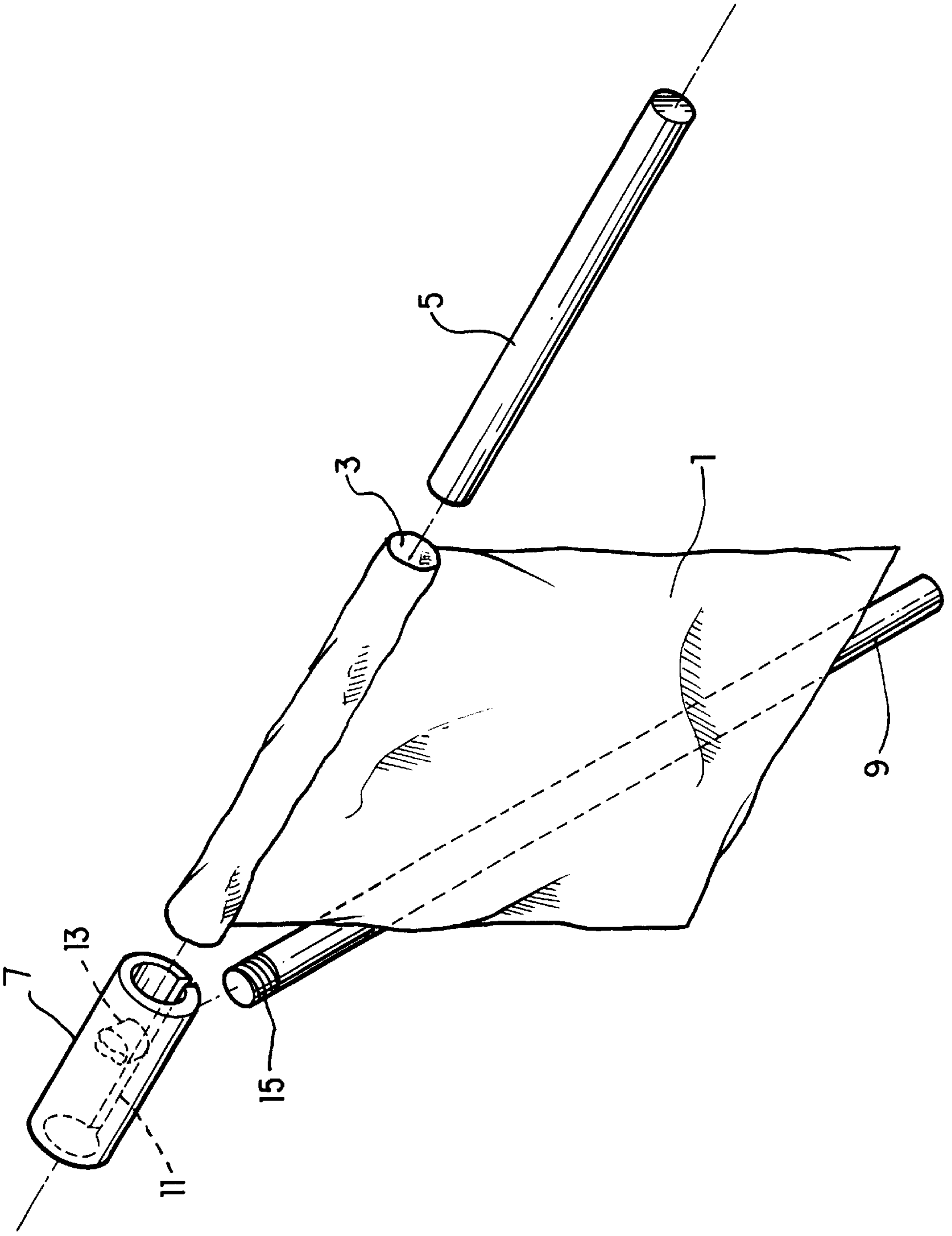
FIG. 1 provides an exploded perspective view of the flag holder of the present invention.

The exploded perspective view of FIG. 1 shows the flag or banner 1 which is to be attached to the holder of the present invention. The flag includes channel 3 formed along one of its ends. The channel may be formed by folding the flag over itself, and sewing the edge to the body of the flag. The channel could be formed in other ways, such as by providing a separate tubular channel, and then attaching that channel, such as by sewing or gluing, to an edge of the flag. The invention should not be deemed limited by the manner in which the channel is constructed. Many flags and banners are already made with a folded edge defining such a channel, so it is often not necessary to construct the channel before practicing the present invention.

The components of the flag holder of the present invention include dowel 5, sleeve 7, and support pole 9. The dowel fits within the channel formed in the flag. Preferably, the dowel has a length which is equal to the length of the channel, so that the dowel fully can fully support the flag, without being exposed to the outside. The dowel can be made of wood, metal, hard plastic, or other relatively rigid material.

The sleeve 7 comprises a cylindrical structure having an inside diameter which is at least slightly greater than the diameter of the dowel. The sleeve has a slit 11 extending along its length. The slit is shown primarily in dotted outline in FIG. 1, but is more clearly shown in FIGS. 2 and 3. The slit allows the sleeve to be inserted over the dowel, and over the flag material, while allowing the main body of the flag to extend freely downward.

The sleeve also includes an opening 13, formed in a side wall of the sleeve. The opening may be threaded, or it may communicate with an extension, described below, which is threaded. In either case, the threads in the sleeve or the threads of the extension match the threads 15 formed at an end of support pole 9, so that the support pole can be screwed into the sleeve. When the support pole is fully screwed into the sleeve, the end of the pole abuts the flag, and holds the flag firmly between the end of the pole and the dowel. Thus, the flag cannot move, and is anchored to the holder.

Figure 3:
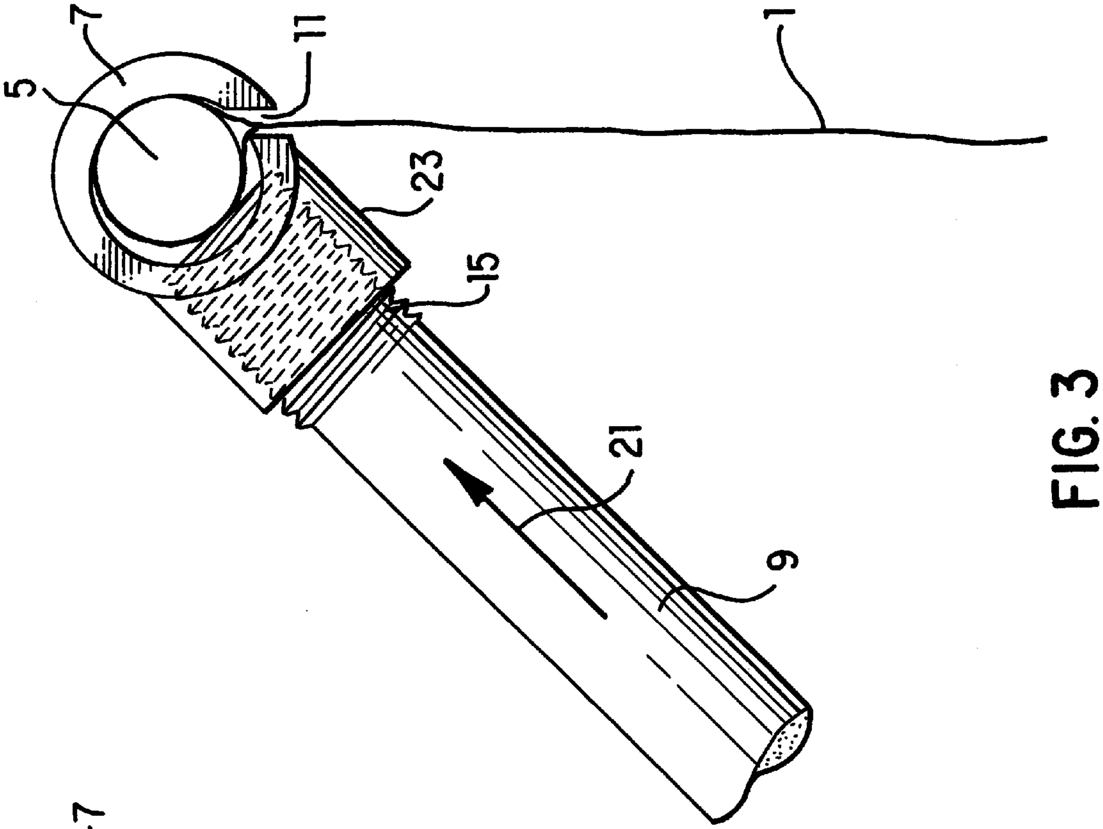
FIG. 3 provides fragmentary end view similar to that of FIG. 2, but showing the condition wherein the support pole has been fully tightened to about the flag.
Figure 2:
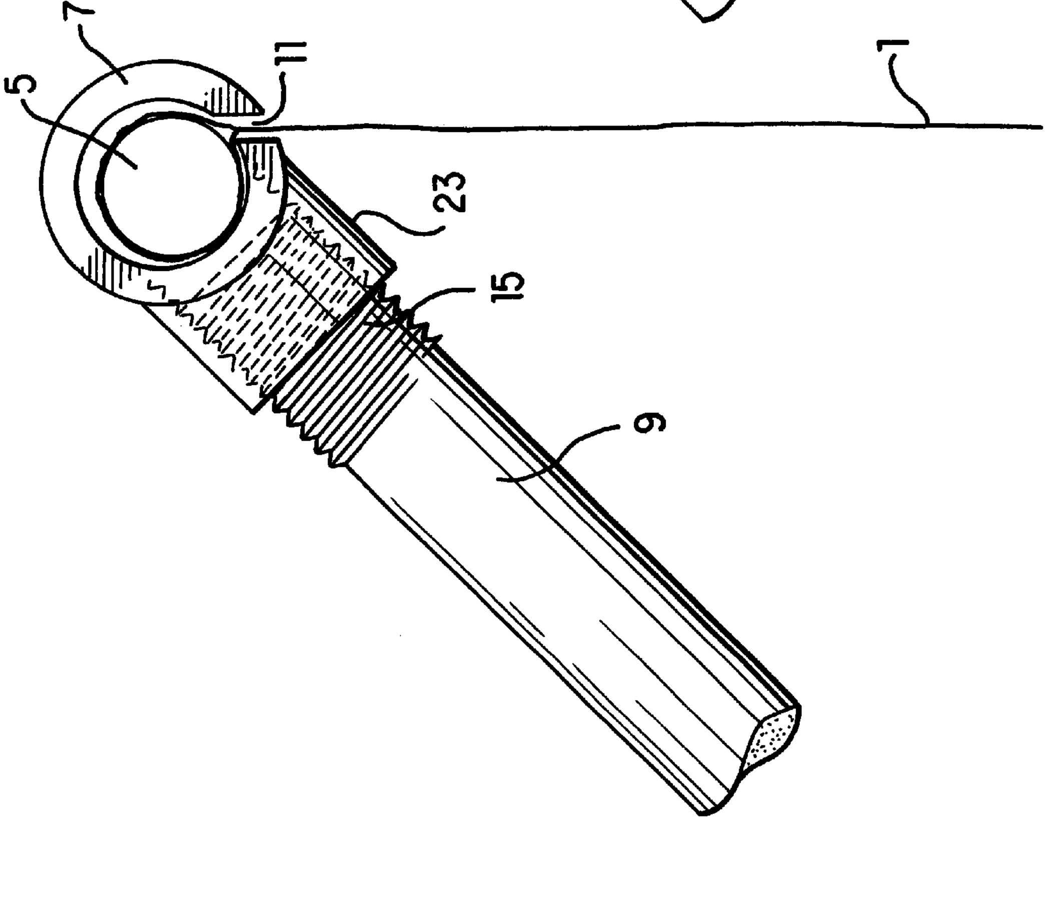
FIG. 2 provides a fragmentary end view of the flag holder of the present invention, showing the condition in which the support pole has not yet been tightened to abut the flag.

FIGS. 2 and 3 show end views illustrating the tightening of the support pole against the flag. These figures clearly show how sleeve 7 surrounds the dowel 5 and the portion of the flag surrounding the dowel. The figures also show how flag 1 extends through slit 11, so that the flag can hang freely from the dowel. In FIG. 2, the support pole has been partially screwed into the sleeve. In this figure, the support pole engages the sleeve, but does not yet touch the flag. In FIG. 3, the support pole has been fully screwed into the sleeve, moving the pole in the direction indicated by arrow 21. FIG. 3 shows the threaded end of the support pole in abutment with the flag, and holding the flag against the dowel. In this condition, the flag is firmly anchored, and cannot slide along the dowel. The flag is also clearly not punctured by a nail or its equivalent.

In FIGS. 2 and 3, there is a threaded extension 23, forming part of the sleeve, the threaded extension providing threads for engaging the support pole as the latter is screwed in. The threaded extension may be integrally formed with the sleeve, or it can be a separate component that is joined to the sleeve later. The threaded extension could also be omitted, in which case the pole screws directly into the sleeve, using only threads formed in the wall of the sleeve. When the threaded extension is present, the combination of the sleeve and extension has the shape of a "T".

Figure 4:
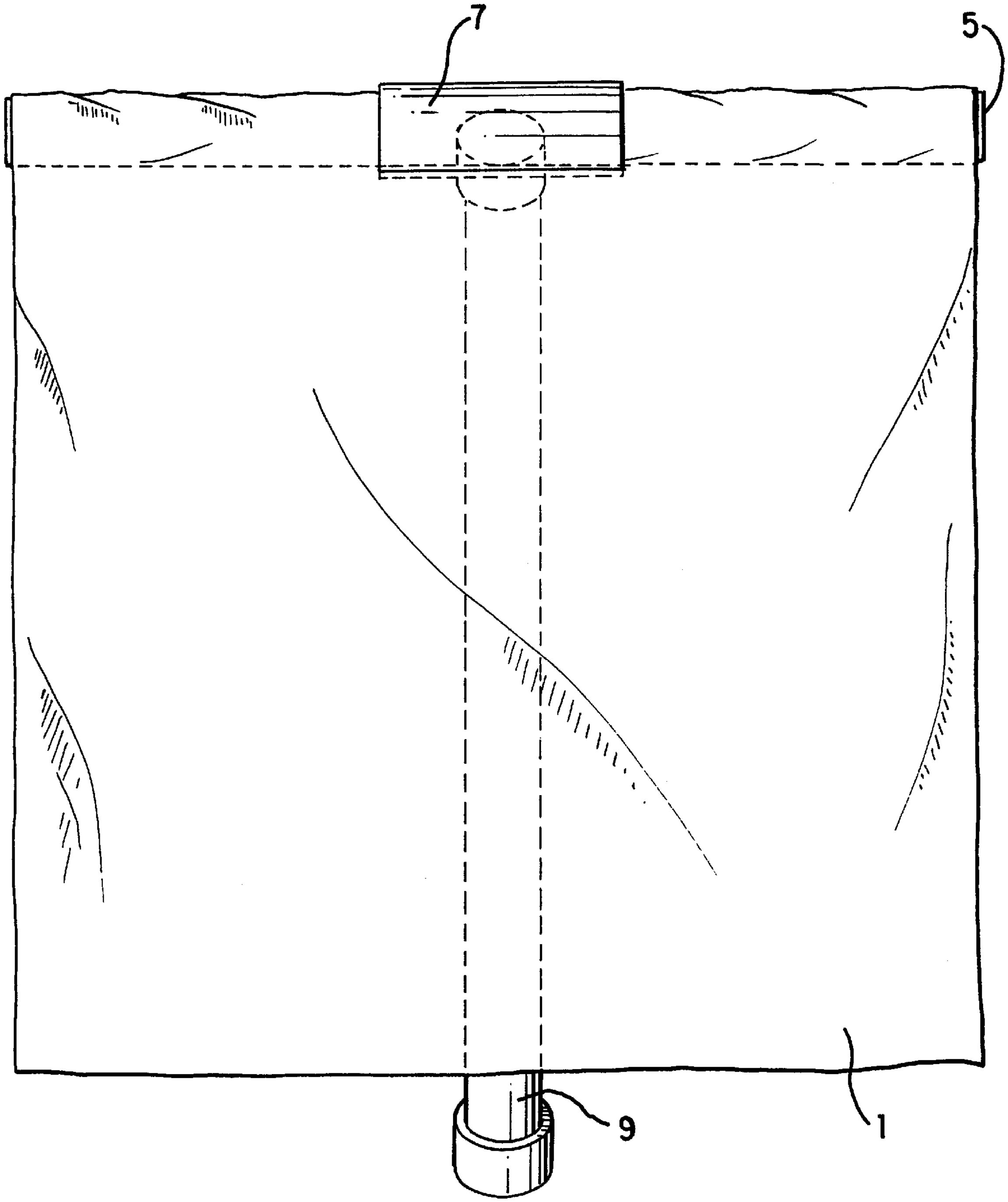
FIG. 4 provides a plan view of the flag holder of the present invention, showing the flag installed.

FIG. 4 provides a plan view of the assembled flag holder, with a flag 1 attached. This figure shows the dowel 5 protruding slightly from the ends of the flag. It also shows the relationship of the sleeve 7 to the support pole 9. As shown in FIG. 4, the sleeve has a length which is much less than the length of the dowel. The length of the sleeve can be varied, within the scope of the invention. In general, a shorter sleeve is easier to use, as it is easier to insert a short sleeve over the flag and dowel. However, the sleeve must be long enough to define the threaded portion to allow the support pole to be screwed in.

To mount a flag using the flag holder of the present invention, one performs the following steps. First, one provides a channel in the end of the flag which is to be supported. As noted above, many flags already have such a channel, defined by a flap of material folded over the flag and sewn or otherwise attached to the flag body. If the flag or banner does not have such a channel, it is easy to make one, or to provide a separate channel, made of fabric or other material, and to attach the channel to the flag.

Next, one inserts the dowel into the channel formed in the flag. One then slides the sleeve over the flag, with the dowel inside the channel, in such a manner that the flag extends through the slit. Preferably, the sleeve is inserted such that the slit faces down, as shown in FIGS. 1–3. As the sleeve slides along the flag and dowel, the position of the flag is unchanged, and remains as shown in FIGS. 2 and 3. One preferably positions the sleeve at or near the center of the flag, as illustrated by FIG. 4.

Next, one screws the support pole into the sleeve, or into the threaded extension of the sleeve. As the support pole is screwed in, its threaded end approaches the flag. Eventually, the end of the support pole can be tightened against the flag, holding the fabric of the flag firmly between the end of the support pole and the dowel. The flag is now firmly anchored.

The support pole can now be inserted into a conventional bracket, such as a bracket that is affixed to a window sill, so that the flag or banner hangs from a window. It is also possible to mount the support pole in other ways, using conventional mounting techniques. To remove the flag from the flag holder, one simply unscrews the support pole from the sleeve. The sleeve can then slide relative to the flag, and can be removed. The dowel can then be removed from the flag, and the flag can be stored.

The components of the flag holder can thus be easily disassembled and stored for later use. When the flag holder is disassembled, the support pole, the dowel, and the sleeve can be made to occupy much less volume than when they were assembled, and thus the device can be stored very efficiently.

The present invention therefore has the primary advantage that it provides a reliable device for firmly affixing a flag to a flag holder, without ever puncturing the flag. The flag can therefore be mounted and removed repeatedly, without damaging the flag.

The invention has the further advantage that it enables a flag to be displayed in alternative orientations. That is, the flag need not be parallel to the ground or perpendicular to the ground, as is true with conventional flag poles, but may be oriented at virtually any angle. The angle of the flag is determined only by the angle made by the support pole relative to the ground. The latter angle is determined by the angle made by the bracket used to hold the support pole.

The invention has the further advantage that it reduces the likelihood that the flag may become wrapped around the support pole, due to the action of the wind. The latter effect arises from the fact that the dowel and sleeve have axes which are perpendicular to that of the support pole. Since the flag hangs from the dowel, and not directly from the support pole, the the flag is highly unlikely to become wrapped around the support pole, even in strong winds.

The invention can be modified in various ways. As noted above, the sleeve can include a threaded extension, or it can simply have threads in its side wall. In either case, the support pole is threadedly received by the sleeve. The length and thickness of the sleeve can also be varied. The shape of the dowel can be varied, and is not necessarily limited to a circular cross-section. These and other variations, which will be apparent to the reader skilled in the art, should be considered within the spirit and scope of the following claims.

What is claimed is:

1. A flag holder, comprising:

a) a dowel, the dowel being adapted to be sized to be inserted into a channel formed in a flag, b) a sleeve, the sleeve comprising a cylindrical body having a slit, the cylindrical body having a length, the slit being generally straight and extending along the length of the cylindrical body, the sleeve being sized to fit over the dowel, the sleeve being connected to a threaded opening, and c) a support pole, the support pole having a threaded end adapted for threaded engagement with the threaded opening and for abutting said flag to secure said flag within said sleeve.

2. The flag holder of claim 1, wherein the sleeve has a threaded extension, and wherein the threaded extension defines at least part of the threaded opening.

3. The flag holder of claim 1, wherein the cylindrical body has a length, and wherein the slit extends along an entire length of the body.

4. Apparatus for supporting a flag, comprising, in combination:

a) a dowel, the dowel having a diameter, b) a sleeve, the sleeve comprising a cylindrical body having an inside diameter which is larger than the diameter of the dowel, wherein the sleeve can be fitted over the dowel, wherein the sleeve has a length, and wherein the sleeve has a generally straight slit extending along all of said length, the sleeve also being connected to a threaded opening, and c) a support pole, the support pole having a threaded end which is threadedly insertable in said threaded opening and for abutting said flag to secure said flag within said sleeve.

5. The apparatus of claim 4, wherein the threaded opening is defined by a threaded extension attached to the sleeve.

6. The apparatus of claim 4, wherein the dowel has a length, and wherein the length of the sleeve is less than the length of the dowel.

7. In combination, a flag and a flag holder, comprising:

a) a dowel inserted into a channel formed along an edge of the flag, b) a sleeve, the sleeve comprising a generally cylindrical body, the sleeve having a length, the sleeve having a slit extending along the length of the sleeve, wherein the flag passes through the slit so as to hang from the dowel, the sleeve also including a threaded opening, and c) a support pole, the support pole having a threaded end which is screwed into the threaded opening of the sleeve, wherein the flag is firmly anchored between the threaded end of the support pole and the dowel.

8. A method of mounting a flag, comprising:

a) inserting a dowel through a channel formed in a vicinity of an edge of the flag, b) sliding a sleeve, the sleeve having a slit, over the dowel, wherein a portion of the flag is disposed between the dowel and the sleeve, and wherein the flag extends through the slit, and c) screwing a support pole into a threaded opening associated with said sleeve, the screwing step being performed until an end of the support pole comes into abutment with the flag.

9. The method of claim 8, wherein the sliding step includes positioning the sleeve in a vicinity of a center of the dowel.

10. A method of mounting a flag to a support pole, the flag including a dowel inserted through a channel associated with the flag, the method comprising the steps of:

a) sliding a generally cylindrical sleeve over the dowel, the sleeve having a slit which permits the flag to extend through the slit, the sliding step being performed such that the sleeve encloses a portion of the dowel and a portion of the flag, and b) screwing a support pole into a threaded opening connected to the sleeve, the screwing step being performed until an end of the support pole comes into abutment with the flag.

11. The method of claim 10, wherein the screwing step is performed until the flag is firmly held between the end of the support pole and the dowel.

* * * * *